No. 828,909. PATENTED AUG. 21, 1906.
G. R. WARD.
PULP MOLDING MACHINE.
APPLICATION FILED JUNE 16, 1905.
6 SHEETS—SHEET 1.
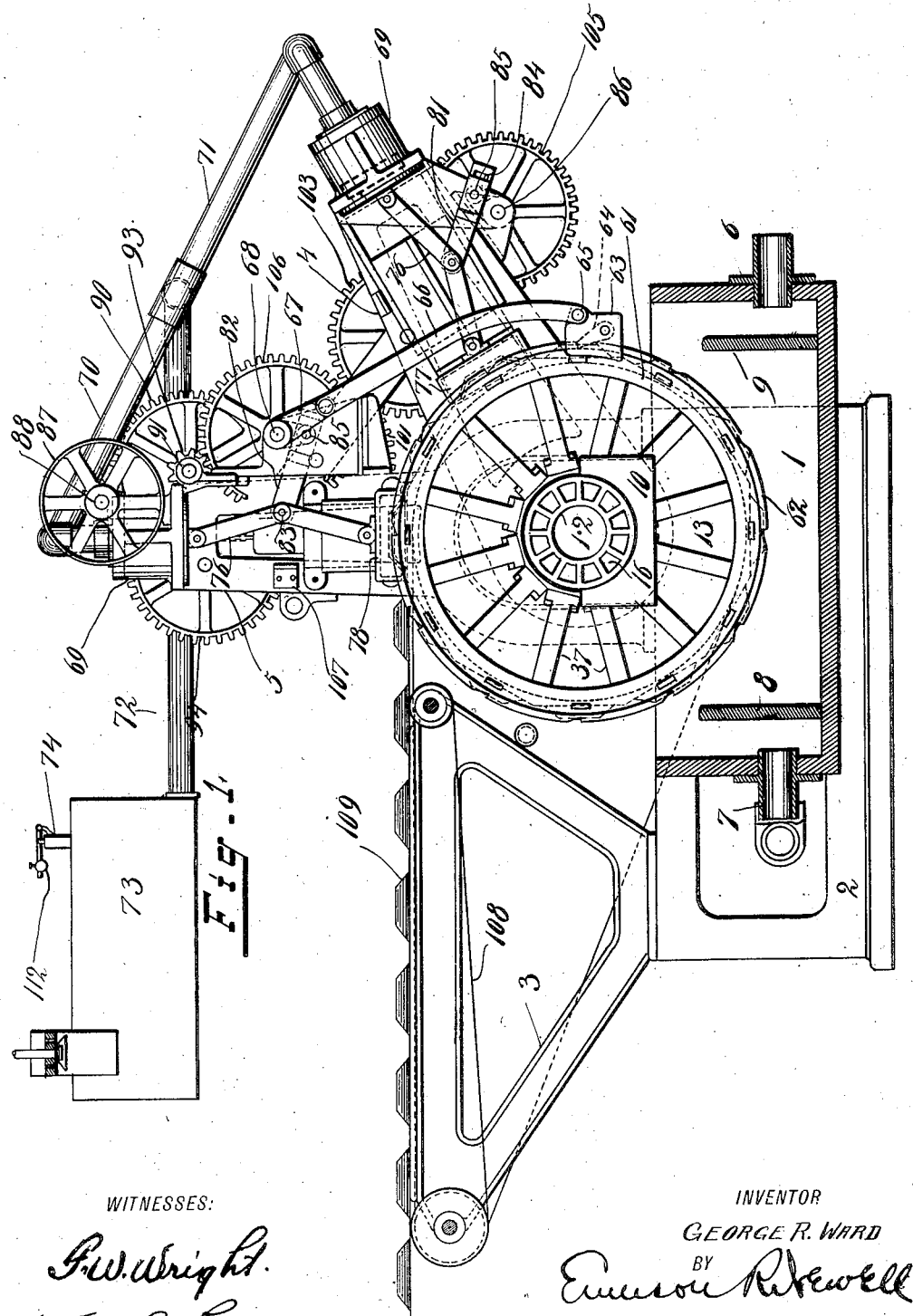
WITNESSES:
G. W. Wright.
Wm. G. Borgman
INVENTOR
GEORGE R. WARD
BY
Emerson Rockwell
ATTORNEY

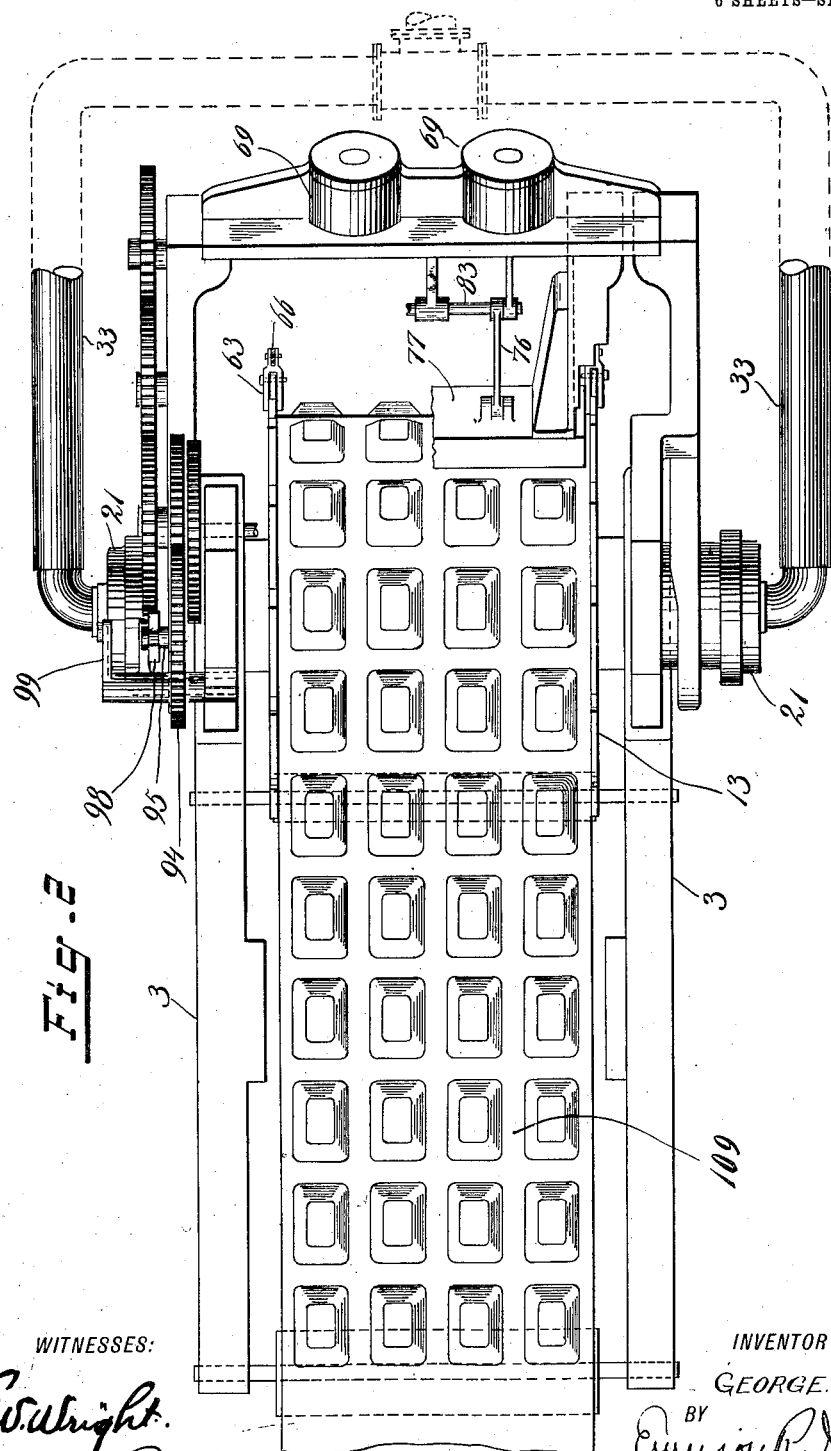

No. 828,909. PATENTED AUG. 21, 1906.
G. R. WARD.
PULP MOLDING MACHINE.
APPLICATION FILED JUNE 16, 1905.
6 SHEETS—SHEET 3.
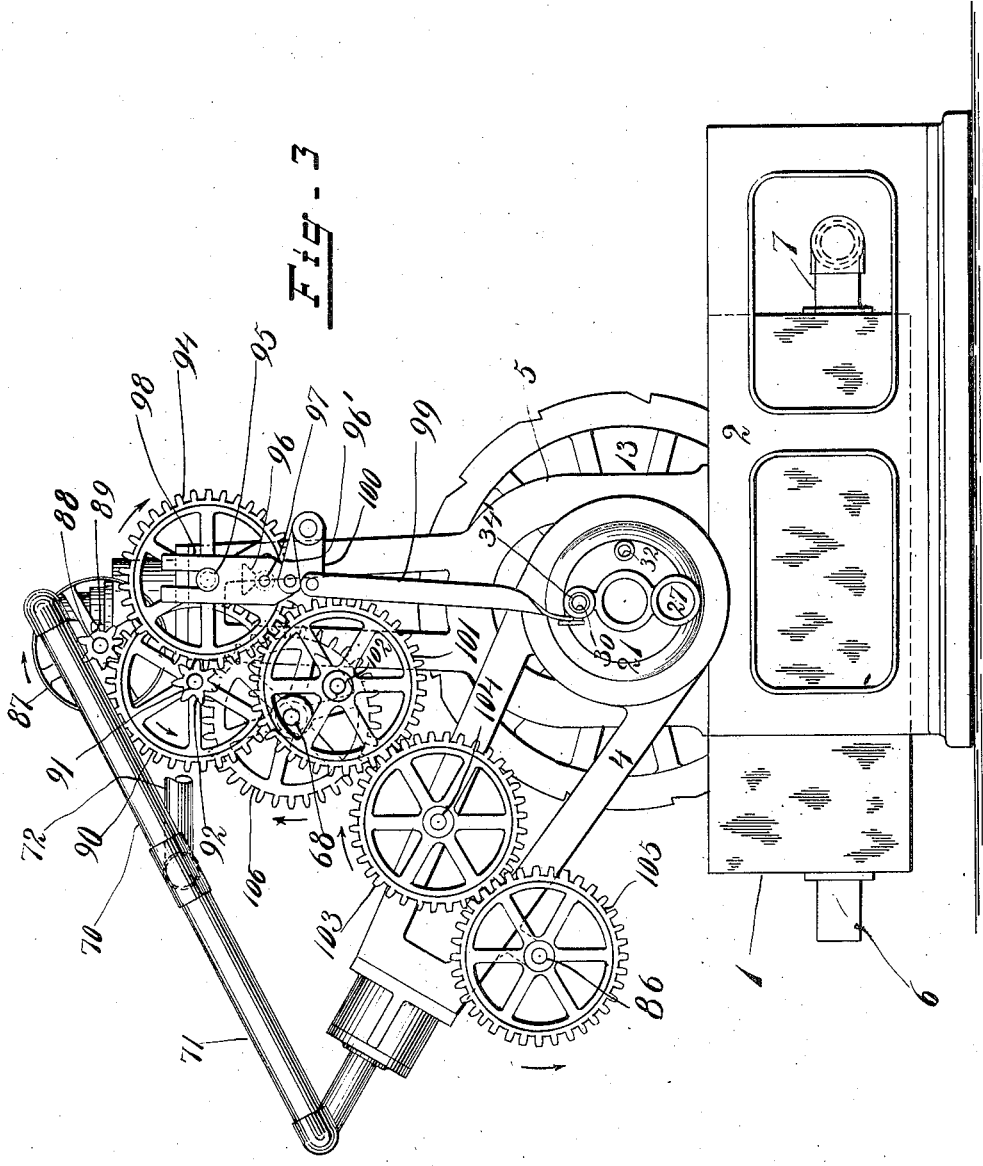
WITNESSES:
F. W. Wright
W^m G. Bergman
INVENTOR
GEORGE R. WARD
BY
Emerson R. Newell
ATTORNEY

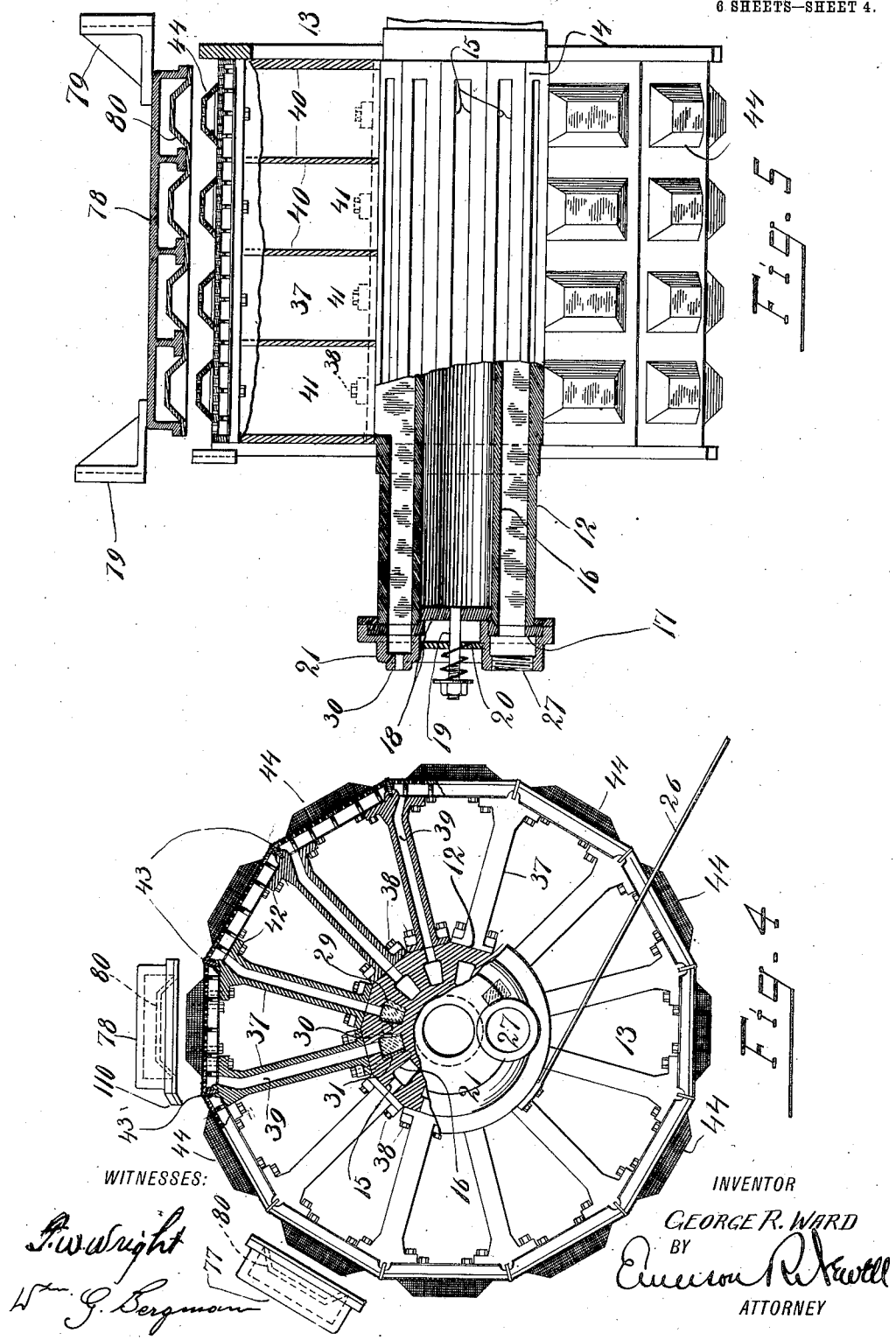

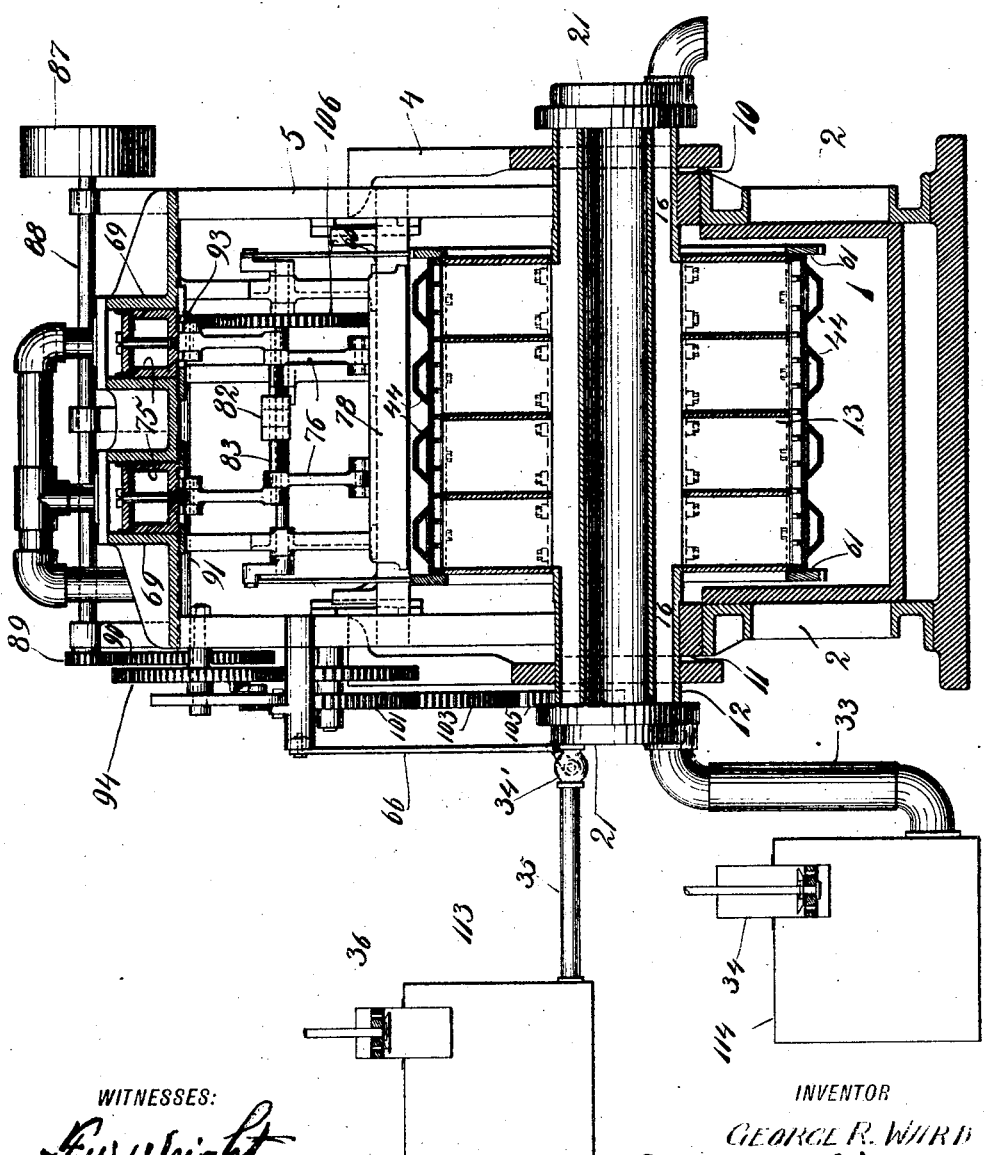

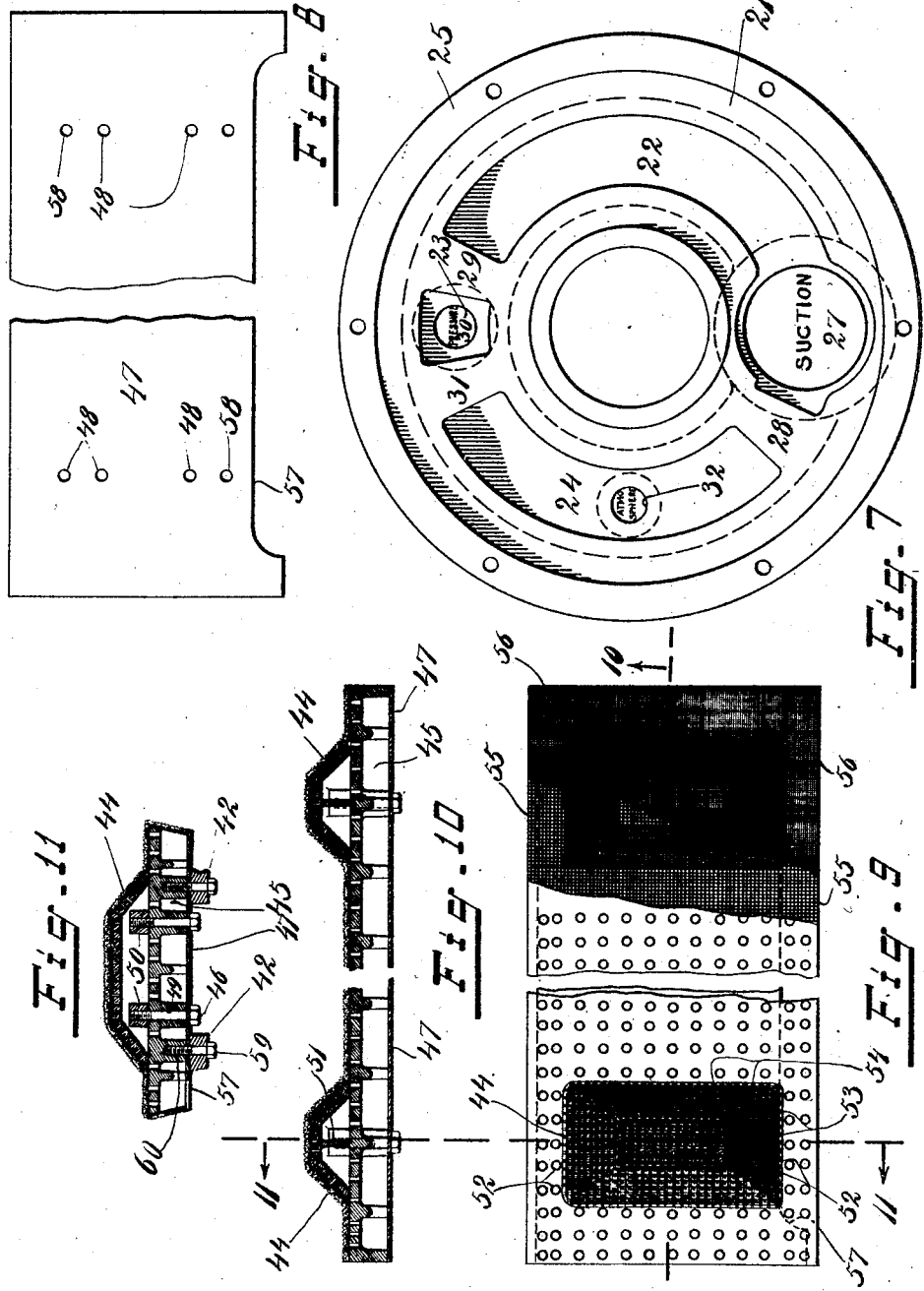

UNITED STATES PATENT OFFICE.

GEORGE R. WARD, OF SANDY HILL, NEW YORK, ASSIGNOR TO THE UNION BAG & PAPER COMPANY, A CORPORATION OF NEW JERSEY.

PULP-MOLDING MACHINE.

No. 828,909.  Specification of Letters Patent.  Patented Aug. 21, 1906.

Application filed June 16, 1905. Serial No. 265,479.

*To all whom it may concern:*

Be it known that I, GEORGE R. WARD, a citizen of the United States, residing at Sandy Hill, New York, have invented certain new and useful Improvements in Pulp-Molding Machines, of which the following is a clear, full, and exact description.

My invention relates to a pulp-molding machine; and my object is to improve and simplify the construction of the same.

My invention will be set forth in the claims.

In that embodiment of my invention as shown in the accompanying drawings my improved machine comprises a vat, a cylindrical mold-carrier rotating therein and having a plurality of mold-faces in parallel lines, each line of mold-faces being connected through channels in the hub or hollow axle with a flat stationary valve fitting the end of the hub and provided with three ports—one for suction, one for air-pressure, and one open to the atmosphere—a pair of reciprocating plunger-molds secured to the frame and adapted to act on the surface of the cylindrical mold-carrier with elastic pressure and connected with the driving-wheel by suitable gear-wheels, which also act to control the opening of the valves, and a belt conveyer for taking off the web as it is formed.

In the drawings, Figure 1 is a side elevation of my improved machine with valve removed and with the vat in section. Fig. 2 is a plan of Fig. 1 with parts broken away for clearness. Fig. 3 is a side elevation taken from the side opposite to that shown in Fig. 1. Fig. 4 is an enlarged view of the mold-carrier and valve, parts being broken away and parts in section. Fig. 5 is an elevation of the carrier at right angles to Fig. 4 with parts in section and parts broken away. Fig. 6 is a vertical central section through the center of the carrier. Fig. 7 is a face view of the stationary portion of the valve, drawn to an enlarged scale. Fig. 8 is a partial plan view of the foundation-plate for each line of mold-faces. Fig. 9 is a plan view of part of one panel with part of the wire covering broken away. Fig. 10 is a section on line 10 10, Fig. 9; and Fig. 11 is a section on line 11 11, Figs. 9 and 10.

The vat 1 (which is one form of a pulp-supply device) is mounted on a base 2, forming a support for the frame 3 of the conveyer and for the double frames 4 5, which carry the reciprocating mold-faces and operating mechanisms. The vat may be provided with inlets 6 and 7 for pulp and baffle-plates 8 and 9. Bearing-blocks 10 and 11, supported on the base 2, serve to support the revolving hub 12 of the mold-carrier 13, which dips into the vat 1 for a part of its lower periphery.

The mold-carrier 13 comprises a hollow hub 12, cylindrical near each end and fitting the bearings 10 and 11, in which it rotates. The mid-portion of hub is many sided—in this instance shown as having twelve sides 14, each side formed for the greater part of its length with slotted openings 15 through the outer shell of the hub and forming a communication from the outside to longitudinal passages 16, formed in the hub and extending from end to end of the same, open at each end of the hub, as shown in Figs. 1 and 4. Each end of the hub is preferably provided with a machined valve-face 17, secured thereto, and there may be within the central bore of the hub a plate 18, having a projecting stud 19, which passes through a plate 20, secured to the valve 21. The valve 21 is formed with three separate passages 22, 23, and 24 (see Fig. 7) and a flange 25, passing over and embracing the valve-face 17, thus connecting all passages 16 of the hub with one of the three valve-passages. To insure the valve being maintained in stationary position, a strap 26 may be fastened to it, as shown in Fig. 4, and made secure at its other end. The three passages 22, 23, and 24 vary in peripheral length, 22 being open to suction from the suction-inlet 27 at the extreme lower part of the valve almost up to the top, while a partition 28 blocks it from the passage 24, a partition 31 separating the pressure-passage 23 from the atmospheric passage 24, which is shown open to the air at 32. The suction-passage 22 is always open to suction through the inlet 27, connected by a pipe 33 with a suction-pump 34 and tank 114. (See Fig. 6.) The outlet 32 to the atmosphere may be at all times open. The outlet 30 to the pressure is preferably controlled through a tappet-valve 34, located on a pressure-supply pipe 35, supplied by a pressure-pump 36 in tank 113 and operated by a lever from the operating mechanisms at stated times, as will hereinafter be fully set forth. Each end of the carrier may be provided with similar valves. In Fig. 2 I have indicated them as each connected together by their suction-piping, while in Fig. 6 I have shown but one so connected, in which case the other would be plugged and act merely as a sealing-cap.

Each polygonal side 14 has a radiating hollow plate-like spoke 37, preferably bolted to it by bolts 38, (see Figs. 4 and 5,) the hollow central opening 39 of each spoke being opposite to the slotted openings 15 in the sides 14. The central portion of each spoke is shown as separated by partitions 40 into a number of chambers 41, each communicating with the mold-faces, as hereinafter described. The outer end of each spoke 37 is provided with outturned lugs 42 and a horizontal slot across its extreme outer surface at one side of the opening 39, into which a spacing-strip 43 is secured.

Each strip of mold-faces is secured to the lugs 42 of the spokes 37, and it is preferably constructed as follows: A convex mold-face 44 (shown herein as a figure with four slanting sides) is secured to a chambered plate 45 and a foundation-plate 47 by bolts 46 passing through openings 48 in the foundation-plate 47, openings 49 in the chambered plate 45, and into threaded lugs 50, carried on ridges 51 of the raised mold-face 44. The mold-face and chambered plate may be perforated with holes 52 and grooved by transverse grooves 53 54. (As shown in Fig. 9, the mold-face only is so grooved, while both are shown as perforated.) A coarse-mesh wire-cloth 55 is placed over the surface of the mold-face and top of the chambered plate, being fitted to the contour of the face, and a second fine-mesh cloth 56 fitted over that. (See Figs. 9 to 11.) The foundation-plate 47 is also provided with a cut-out edge 57 and bolt-holes 58.

The entire unitary strip of mold-faces, as shown in Figs. 4, 5, and 11, is placed between two strips 43 with the cut-out portion 57 over the passage 39 in one spoke and bolts 59 passed through the lugs 42, through holes 58 in the foundation-plate 47, and into threaded studs 60 in the chambered plate 45, so that upon tightening the bolts 59 the entire unit of mold-faces will be drawn down upon the end surfaces of the spokes and its sides tightly forced against the spacing-strips 43 to form a free and clear passage from the valve through one of the longitudinal passages in the hub, through a slotted opening in the mid-portion of the hub, through a hollow spoke, through a cut-out edge of the foundation-plate into the chamber formed by the spacing-strips, foundation-strips, and chambered plate, through the perforations of the chambered plate and the hollow raised mold-faces, through the wire covering to enable pulp to be drawn onto the same by suction and the web to be loosened by air-pressure, as hereinafter described. I have shown the mold-carrier as also supplied with toothed rings 61, formed with a flange 62, (see Fig. 1,) embraced by a block 63, which flange acts as a track for the block. The block carries a pawl 64, engaging the ratchet-teeth of the rings, of which teeth there are as many as there are unit strips of molds. The block 63 is pivoted at 65 to the end of an operating-strap 66, connected at its other end to a crank-lever 67, fixed on a shaft 68, mounted on a bracket on the frame 5 and operated by gearing once to every pressing operation of the machine. Each frame 4 and 5 has one or more cylinders 69, mounted at its outer end and connected by piping 70 71 with a common pipe 72, entering a pressure-tank 73, supplied with an adjustably-weighted blow-off valve 74. In each cylinder is a piston 75, connected by toggle-levers 76 with the recessed mold-strips 77 78. Each mold-strip 77 78, as shown in Figs. 1, 4, 5, and 6, has guides 79 slidable on the frames 4 and 5 and is provided with recessed mold-faces 80, so located and positioned in relation to the carrier as to fit over a unit strip of convex mold-faces of the drum when that carrier has been properly moved by the pawl.

To operate the recessed mold-face, connecting-rods 81 82 are fastened to the rods 83, forming the central pivot-points of the toggle-levers and provided with a slotted end in which a block 84 may slide. The blocks are mounted upon crank-pins 85, secured to shafts 68 and 86, connected to the driving mechanisms. The driving mechanisms for operating strap and ratchet, toggles, and mold-faces are comprised of a train of gear-wheels as follows: A driving-pulley 87 on a shaft 88 gives motion to a pinion 89 on the shaft. The pinion 89 meshes into a gear 90 on a shaft 91. Shaft 91 carries two pinions 92 93. Pinion 92 (see Fig. 3) meshes with gear 94 on shaft 95, which gear 94 carries a V-shaped cam 96 for engagement with an antifriction-bearing 97 on a forked guide-rod 98, which straddles the shaft 95 and is attached to a lever 96', pivoted to the frame and operating a lever 100, attached to a connecting-rod 99, adapted to operate the tappet-valve 34' to give a blast of air to the pressure-opening 23 of the valve 21 when desired. The gear 94 meshes with gear 101 on shaft 102. 101 meshes with gear 103 on shaft 104, which in turn meshes with gear 105 on shaft 86. The pinion 93 (see Fig. 1) meshes with the gear 106 on the shaft 68. Stops 107 may be located, as shown, on frame 5, to prevent the toggles from being thrown too far over when being released.

The conveyer shown is an ordinary endless belt conveyer 108, mounted on the frame 3. The web 109 of molded dishes is shown as passing onto the belt in Figs. 1 and 2. One of the reciprocating faces may be provided with a projecting edge 110 (see Fig. 4) for compressing the pulp which bridges over from one panel to the next across the spacing-strip 43 to produce a web firm and strong throughout.

The operation is as follows: Liquid pulp is admitted to the vat 1 and the pressure and suction pumps of Figs. 1 and 6 started. Immediately all those openings in the end of the hub opposite the suction-channel of the valve will be exhausted of air, draining air through their respective spokes and mold-faces to take on pulp in the well-known manner on their outer surfaces. During each complete rotation of the gear-wheels the pawl will advance the drum one tooth, dragging the pulp-covered surface out of the vat up toward the pressing-faces, the pulp being maintained upon the surface until, as shown in dotted lines, Fig. 4, the unit strips almost reach the upper part of the mold-carrier, after that they are exposed to the pressure-opening, which does not produce any effect until it is opened by the tappet-valve 34. From the uppermost position to the taking-on or suction position the surface is exposed to atmosphere through the outlet 30 of the valve. When the mold-carrier comes to rest, the connecting-rods of the toggle-levers will be thrown to straighten the toggle-levers, forcing the upper mold-faces down upon the corresponding convex mold-faces to compress the pulp thereon. This pressure is automatically maintained constant, because of the resilient mounting of one end of the toggle-levers on the piston in the pressure-cylinder; but the pressure may be adjusted by moving weight 112. Resiliently mounting one of the mold-faces, between which the pulp is pressed, is an advantage, for the thickness of pulp may be varied on a face, and when the pulp thereon is compressed extra thickness might break or severely strain the parts unless one of the faces could yield under pressure. Upon the release of the recessed or upper mold-faces the tappet-valve is operated through the cam, pawl, and ratchet and a quick blast of air directed through that mold-face immediately below the upper plunger. This successively blows the molded web off the raised mold-faces, preserving the web-like formation, as seen in Fig. 1. To prevent the spacing-strips between each unit-mold line from forming weaknesses across a web, I have provided the overlapping edge 110, so that all parts of the web will be compressed.

It will be observed that the reciprocating mold-face 80 is one embodiment of a means independent of the mold-carrier—that is, not mounted on said carrier—to firmly compress the layer of pulp upon a traveling mold-face 44, so as to compact the fibers of the pulp. It is preferable to exert the pressure in a direction perpendicular to the axis of the carrier, as in this way a construction is attained which may be made very strong as the pressure is taken up by the axle and bearing-blocks upon which the carrier rotates, and in the present embodiment this pressure is exerted toward the axis of the carrier. I prefer to arrange the convex mold-faces 44 so that the general plane of each face is substantially perpendicular to the plane of rotation of the carrier, which plane of rotation in the present embodiment is vertical.

In the present embodiment of my invention, as shown in the drawings, I have perforated the carrier between the convex portions of the mold-faces and have applied suction through said faces in succession and also through the perforations between the same, so that there is formed a continuous web of pulp which includes the pulp deposited on two successively adjacent faces 44 and also between the same—that is, the pulp deposited on one face 44 is joined to the pulp deposited on the next succeeding face. I also preferably perforate the carrier at each side of said faces continuously around said carrier, so that the continuous web of pulp will include the pulp deposited on the two faces and between each two of the same, by which construction a continuous web of pulp of any length desired may be taken off without any break therein. Figs. 9, 10, and 11 illustrate a panel of the carrier with convex mold-faces 44 thereon, and in order to form the perforations between two successive faces I have perforated the chambered plate 45 with holes substantially up to the edge of the same and have covered the plate with the layers of wire-gauze. When suction is applied, air will draw through the holes in the plate and through the meshes of the wire-gauze and give the effect of minute perforations extending entirely over the upper face of the panel, and the dividing-ribs 43 (see Fig. 4) may be made so thin that the pulp deposited on one panel will be joined to the pulp deposited on the next succeeding panel, so as to form a continuous web. In the present embodiment the web is removed from the faces in succession by a pressure of air which is greater than ordinary atmospheric pressure.

I prefer to compress all parts of the web by successive pressures, and in the present embodiment the reciprocating mold 78 is of a sufficient width to overlap a portion of said web which is compressed by said face at the preceding compression, for it will be observed that the extension 110 will compress a portion of the web on the panel next to be brought under the face 80 and that this portion of the web on said panel at the next compression will be overlapped and compressed by the right side of the mold 78 at the succeeding compression, so that all parts of the web between two succeeding faces will be compressed by said reciprocating mold-face. The different panels, one of which is illustrated in Figs. 9 to 11, are independently removable, which is an advantage when one becomes broken or damaged or clogged. I prefer to have the handles independently removable and have so shown them in the particular embodiment of my invention shown in the drawings; but it will be observed that the succession of panels in effect form a substantially continuously perforated substantially cylindrical surface with mold-faces thereon.

The pistons 75 in the chambers 69, together with the compression-chamber 73, form one embodiment of a resilient means for allowing the reciprocating mold-face to yield when pressed against a corresponding face on the carrier, and the blow-off valve 74 and adjustable weight 112 for regulating the pressure (see Fig. 1) is one form of a means for adjusting the resilient pressure on said pistons.

While in the drawings I have illustrated and have heretofore particularly described a specific embodiment of my invention, I am aware that many variations therefrom may be made without departing from the spirit of my invention as claimed, and I therefore do not limit myself to the constructions heretofore specifically described and illustrated in said drawings.

What I claim is—

1. In a pulp-molding machine in combination, a rotating carrier having thereon a perforated mold-face, means to automatically deposit a layer of pulp thereon, and means independent of said carrier to firmly compress said layer upon said face in a direction perpendicular to the axis of said carrier and comprising a second mold-face shaped to compress substantially all parts of said layer simultaneously.

2. In a pulp-molding machine in combination, a rotating carrier having thereon a perforated mold-face, means to automatically deposit a layer of pulp thereon, and means independent of said carrier to firmly compress said layer upon said face in a direction toward the axis of said carrier and comprising a second mold-face shaped to compress substantially all parts of said layer simultaneously.

3. In a pulp-molding machine in combination, a rotating carrier having thereon a perforated mold-face, means to automatically deposit a layer of pulp thereon, and means to firmly compress said layer upon said face in a direction toward the axis of said carrier and comprising a second mold-face independent of said carrier and movable toward and away from said first face and means to force said second face against said first face.

4. In a pulp-molding machine in combination, a vat, a rotating carrier having thereon a succession of perforated mold-faces whose planes are substantially perpendicular to the plane of rotation of said carrier and dipping in succession into said vat, means to automatically deposit a layer of pulp upon said faces in succession, and means independent of said carrier to firmly compress said layer upon said faces in succession and in a direction toward the axis of said carrier.

5. In a pulp-molding machine in combination, a rotating carrier having thereon a perforated mold-face, suction means to automatically deposit a layer of pulp thereon, and a second mold-face independent of said carrier and nesting with said first face to firmly compress said layer upon said face in a direction perpendicular to the axis of said carrier.

6. In a pulp-molding machine in combination, a rotating carrier having thereon a perforated mold-face, suction means to automatically deposit a layer of pulp thereon, and a second mold-face independent of said carrier to firmly compress said layer upon said face in a direction perpendicular to the axis of said carrier, and means to force a blast of air through said first face to loosen the article therefrom.

7. In a pulp-molding machine in combination, a pulp-vat, a rotating carrier having thereon a perforated mold-face adapted to dip into said vat, means to apply suction to said face when in said vat to deposit a layer of pulp thereon, a second mold-face independent of said carrier, and means to move said second face and press the same against said first face to form the article.

8. In a pulp-molding machine in combination, a pulp-vat, a rotating carrier having thereon a perforated mold-face adapted to dip into said vat, means to apply suction to said face when in said vat to deposit a layer of pulp thereon, a second mold-face independent of said carrier and located outside the pulp in said vat, and means to move said second face and press the same against said first face to form the article.

9. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same.

10. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, means to release said suction from said faces in succession, and means for removing said web from said faces in succession.

11. In a pulp-molding machine in combination, a pulp-vat, a traveling mold-carrier having thereon two or more perforated convex mold-faces adapted to dip in succession into said vat, said carrier being also perforated between said faces, means to apply suction through said faces in succession and also between the same whereby there is formed a continuous web of pulp which includes the pulp deposited on said faces and between the same.

12. In a pulp-molding machine in combination, a pulp-vat, a traveling mold-carrier having thereon two or more perforated mold-faces adapted to dip in succession into said vat, said carrier being also perforated between said faces at each side thereof, means to apply suction through said faces in succession and also between the same whereby there is formed a continuous web of pulp which includes the pulp deposited on said faces and between each two of the same, means to release said suction from said faces in succession, and means operated by air-pressure for removing said web from said faces in succession.

13. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and means for compressing the pulp upon said faces in succession.

14. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and means for compressing all parts of said web by successive pressures.

15. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and a reciprocating molding-face for compressing the pulp upon said faces in succession.

16. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and a reciprocating molding-face for compressing the pulp upon said faces in succession, said reciprocating molding-face being of a sufficient width to overlap a portion of said web compressed by said face at the preceding compression.

17. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and a reciprocating mold-face for compressing all parts of said web by successive pressures.

18. In a pulp-molding machine in combination, a pulp-vat, a traveling mold-carrier having thereon two or more perforated mold-faces adapted to dip in succession into said vat, said carrier being also perforated between said faces at each side thereof, means to apply suction through said faces in succession and also between the same whereby there is formed a continuous web of pulp which includes the pulp deposited on said faces and between each two of the same, means to release said suction from said faces in succession, and means operated by air-pressure for removing said web from said faces in succession, and means for compressing all parts of said web by successive pressures.

19. In a pulp-molding machine in combination, a pulp-vat, a traveling mold-carrier having thereon two or more perforated mold-faces adapted to dip in succession into said vat, said carrier being also perforated between said faces, means to apply suction through said faces in succession and also between the same whereby there is formed a continuous web of pulp which includes the pulp deposited on said faces and between the same, and means for compressing the pulp upon said faces in succession, and means for removing said web by air-pressure.

20. In a pulp-machine in combination, a traveling molding device comprising a succession of perforated panels, each panel including a mold-face adapted to shape a layer of pulp deposited thereon, means for supplying a suitable pulp to said panels including a suction device to apply suction through said panels in succession, said panels lying closely adjacent each other whereby the pulp deposited on two successive panels will form a continuous web, said panels being separated from each other by air-tight partitions.

21. In a pulp-machine in combination, a traveling molding device comprising a succession of perforated panels, each panel including a mold-face, means for supplying a suitable pulp to said panels including a suction device to apply suction through said panels in succession, said panels lying closely adjacent each other and separated by air-tight partitions terminating in narrow partitions at the surface whereby the pulp deposited on two successive panels will form a continuous web.

22. In a pulp-machine in combination, a traveling molding device comprising a succession of perforated and independently-removable panels, each panel including a mold-face, means for supplying a suitable pulp to said panels including a suction device to apply suction through said panels in succession, said panels lying closely adjacent each other whereby the pulp deposited on two successive panels will form a continuous web.

23. In a pulp-machine in combination, a traveling molding device comprising a succession of perforated panels, each panel including a mold-face, means for supplying a suitable pulp to said panels including a suction device to apply suction through said panels in succession, said panels lying closely adjacent each other whereby the pulp deposited on two successive panels will form a continuous web, and means to remove said web without destroying the form of said web as molded by said faces.

24. In a pulp-machine in combination, a traveling molding device comprising a succession of perforated panels, each panel including a mold-face, means for supplying a suitable pulp to said panels including a suction device to apply suction through said panels in succession, said panels lying closely adjacent each other whereby the pulp deposited on two successive panels will form a continuous web, and means to remove said web by a blast of air through said panels in succession.

25. In a pulp-machine in combination, a pulp-vat, a traveling mold-carrier provided with a series of perforated mold-faces adapted to dip into said vat in succession and suitable devices to move said carrier intermittently, means to apply suction through said faces in succession whereby a layer of pulp is deposited on each face, and a molding device relatively stationary with respect to the movement of said carrier and reciprocating toward and away from a face on said carrier when said carrier is at rest and adapted to compress the said layers upon said faces in succession.

26. In a pulp-machine in combination, a pulp-vat, a traveling mold-carrier provided with a series of perforated convex mold-faces adapted to dip into said vat in succession and suitable devices to move said carrier intermittently, means to apply suction through said faces in succession whereby a layer of pulp is deposited on each face, and a concave molding device relatively stationary with respect to the movement of said carrier and reciprocating toward and away from a face on said carrier when said carrier is at rest and adapted to compress the said layers upon said faces in succession.

27. In a pulp-machine in combination, a pulp-vat, a traveling mold-carrier provided with a series of perforated mold-faces adapted to dip into said vat in succession and suitable devices to move said carrier intermittently, means to apply suction through said faces in succession whereby a layer of pulp is deposited on each face, and a molding device relatively stationary with respect to the movement of said carrier and reciprocating toward and away from a face on said carrier when said carrier is at rest and adapted to compress the said layers upon said faces in succession, and resilient means allowing said molding device to yield when pressed against said face.

28. In a pulp-machine in combination, a pulp-vat, a traveling mold-carrier provided with a series of perforated mold-faces adapted to dip into said vat in succession and suitable devices to move said carrier intermittently, means to apply suction through said faces in succession whereby a layer of pulp is deposited on each face, and a molding device relatively stationary with respect to the movement of said carrier and reciprocating toward and away from a face on said carrier when said carrier is at rest and adapted to compress the said layers upon said faces in succession, and means to force a blast of air through said mold-faces in succession after the layer thereon has been compressed.

29. In a pulp-machine in combination, a pulp-vat, a rotating mold-carrier having thereon a succession of perforated convex mold-faces, means for rotating said carrier intermittently whereby said faces dip in succession into said vat, said carrier being also perforated between said faces, means to apply suction through said faces in succession and also between the same whereby there is formed a continuous web of pulp which includes the pulp deposited on said faces and between the same, a reciprocating molding-face located outside of the pulp in said vat and nesting with the faces on said carrier and adapted to compress the pulp upon said faces in succession, means to release the suction from said faces in succession after the layer thereon has been compressed, and means to force a blast of air through said faces to loosen the web therefrom in succession.

30. In a pulp-molding machine in combination, a vat, a rotating carrier having fixed thereon a succession of perforated mold-faces adapted to dip in succession into said vat, a suction device to apply suction through said faces in succession to deposit a layer of pulp on each face, a molding device located outside of the pulp in said vat and registering with said faces in succession, and means to move said molding device and press the same against said faces in succession and in a direction toward the axis of said carrier.

31. In a pulp-molding machine in combination, a vat, a rotating carrier having fixed thereon a succession of perforated mold-faces adapted to dip in succession into said vat, a suction device to apply suction through said faces in succession to deposit a layer of pulp on each face, a reciprocating molding device located outside of the pulp in said vat, shaped to simultaneously compress substantially all parts of the layer on a face, and registering with said faces in succession, and means to move said molding device and press the same against said faces in succession and in a direction toward the axis of said carrier.

32. In a pulp-machine in combination, a traveling molding device comprising a succession of perforated panels, each panel including a mold-face covered with wire-gauze and adapted to shape a layer of pulp deposited thereon, means for supplying a suitable pulp to said panels including a suction device to apply suction through said panels in succession, said panels lying closely adjacent each other whereby the pulp deposited on two successive panels will form a continuous web, said panels being separated from each other by air-tight partitions, and means for removing said web without destroying the form of said web as molded by said faces.

33. In a pulp-machine in combination, a vat, a traveling carrier having thereon a succession of groups of perforated mold-faces, each group comprising a plurality of mold-faces located adjacent each other in the general direction of the axis of said carrier, said groups being adapted to dip in succession into said vat, suction means to apply suction through said groups to deposit a layer of pulp on each face, a molding device located outside of the pulp in said vat and registering with a group, means to press said molding device against said groups in succession, and means for removing the formed articles.

34. In a pulp-machine in combination, a vat, a rotating carrier having thereon a succession of groups of perforated mold-faces, each group comprising a plurality of mold-faces located adjacent each other in the general direction of the axis of said carrier, said groups being adapted to dip in succession into said vat, suction means to apply suction through said groups to deposit a layer of pulp on each face, a reciprocating molding device located outside of the pulp in said vat and registering with said groups in succession, means to move said molding device and press the same against said groups in succession, and means for removing the formed articles from said faces.

35. In a pulp-molding machine in combination, a rotating carrier having thereon a succession of perforated mold-faces, each adapted to shape a layer of pulp deposited thereon, means to deposit a suitable pulp upon said faces in succession and including a pulp-supply device and suction means to apply suction through said faces in succession, molding means independent of said carrier, and suitable actuating devices to move said molding means and faces together in a direction substantially perpendicular to the axis of said carrier and firmly compress said pulp upon said faces in succession.

36. In a pulp-molding machine in combination, a traveling mold-carrier having thereon a succession of perforated mold-faces adapted to shape a layer of pulp deposited thereon, said carrier being also perforated between said faces, means to apply suction through said faces in succession and also between the same, and suitable means for supplying pulp to said carrier, whereby there is formed a continuous web of pulp which includes the pulp deposited on said faces and between the same, and means for removing said web without destroying the form of said web as shaped by said faces.

37. In a pulp-molding machine in combination, a traveling mold-carrier having thereon a succession of perforated mold-faces adapted to shape a layer of pulp deposited thereon, said carrier being also perforated between said faces, means to apply suction through said faces in succession and also between the same, and suitable means for supplying pulp to said carrier, whereby there is formed a continuous web of pulp which includes the pulp deposited on said faces and between the same, and means for removing said web without destroying the form of said web as shaped by said faces, and suitable pressing means to firmly compress the pulp deposited upon said faces prior to the removal of said web.

Signed at New York, N. Y., this 14th day of June, 1905.

GEORGE R. WARD.

Witnesses:
EMERSON R. NEWELL,
F. WARREN WRIGHT.